Patented May 20, 1930

1,759,116

UNITED STATES PATENT OFFICE

WILLIAM C. HOOEY, OF PALMERTON, PENNSYLVANIA, ASSIGNOR TO THE NEW JERSEY ZINC COMPANY, OF NEW YORK, N. Y., A CORPORATION OF NEW JERSEY

MANUFACTURE OF LITHOPONE

No Drawing. Application filed December 15, 1925. Serial No. 75,622.

This invention relates to the manufacture of lithopone and has for its object the provision of certain improvements in lithopone manufacture.

Lithopone is a white pigment composed of zinc sulfide and barium sulfate. In the manufacture of lithopone, aqueous solutions of zinc sulfate ($ZnSO_4$) and barium sulfide (BaS) are mixed in about molecular proportions. Upon the mixing of these solutions there results a heavy, flocculent, white precipitate consisting of an intimately associated admixture of zinc sulfide (ZnS) and barium sulfate ($BaSO_4$). The coprecipitate of zinc sulfide and barium sulfate is washed, filter-pressed and dried. The dried product is known in the industry as "crude lithopone". Crude lithopone is not suitable for paint purposes, but when it is heated, say to a temperature of 650–900° C., and suddenly cooled, by plunging (quenching) into cold water, its physical properties are so modified as to adapt it for paint purposes.

The solutions of zinc sulfate and barium sulfide are generally mixed in wooden tubs or tanks. Thus, it is the usual practice to introduce a predetermined quantity of the zinc sulfate solution or liquor into the precipitating tank and then to gradually add the barium sulfide solution or liquor with constant stirring until tests show the desired reaction to have been completed. It is the customary practice to continue the addition of the barium sulfide solution until appropriate tests indicate the presence of an "excess" of that solution over and above the amount required to satisfy the zinc sulfate in accordance with the following reaction:

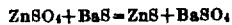

Heretofore, the desired "excess of barium sulfide" in the precipitating liquors, and hence the end-point of the precipitating step or reaction, has been usually determined by testing a filtered sample of the mixture (crude pulp) in the precipitating tank for barium (as by titration with sulfuric acid) or for sulfide sulfur (as by titration with iodine or with a solution of zinc chloride). I have discovered that crude lithopones of uniform properties cannot be produced where the "excess" of barium sulfide and the end-point of the precipitating reaction is determined by these heretofore customary methods of testing. Thus, I have found in actual plant practice (with all other conditions and manipulative steps, the same) that crude lithopones of different physical properties may result when the precipitation is carried on under apparently identical conditions with identically the same "excess" of barium sulfide at the completion of the reaction as indicated by these heretofore customary tests.

It has heretofore been recognized as a scientific fact that an aqueous solution of barium sulfide does not contain barium sulfide (BaS) as such, but that upon solution the chemical compound "BaS" is hydrolized so that the barium is present in solution as barium hydrate ($Ba(OH)_2$) and barium sulfhydrate ($Ba(SH)_2$). This hydrolizing of barium sulfide when dissolved in water may be expressed by the following equation:

In the lithopone industry, this dissociation of barium sulfide when dissolved in water has not been recognized, or, if recognized, has been considered of no significance or importance. Thus, the heretofore customary methods of determining the so-called "barium sulfide excess" and hence the end-point of the precipitating reaction have been based on the supposition that the barium was present as the chemical compound "barium sulfide", or, in any event, that a determination of either barium or sulfide sulfur accurately indicated the desired "excess" of barium sulfide in the precipitating liquors.

I have found that these heretofore customary methods of expressing and determining the end-point of the precipitating reaction in terms of barium or sulfide sulfur are unreliable and under plant conditions of manufacture cannot be depended upon to produce uniform crude lithopones. I have, moreover, discovered that the significant factor in determining the so-called "barium sulfide excess" is not the amount of barium or sulfide sulfur in the filtered sample of the crude pulp as heretofore supposed, but the excess of and ratio between the amounts of barium present in solution as hydrate and sulfhydrate. The effective excess of barium liquor in the crude pulp (at the endpoint of the precipitating step) is further dependent upon (usually proportional to) the amount of mother liquor left in the crude press cake.

In my copending application, Serial No. 75,621 filed Dec. 15, 1925, I have described the determination of the end-point of the reaction between the zinc sulfate and barium sulfide solutions, in the precipitating step, by analyzing or testing for hydrate and sulfhydrate radicals and establishing a predetermined excess of and ratio between the hydrate and sulfhydrate radicals in the crude pulp. The present invention is based upon my discovery that certain physical properties of the finished lithopone and certain manipulative steps of manufacture are influenced by the excess of and ratio between the hydrate and sulfhydrate radicals in the crude pulp. The invention involves, in its broad aspect, control of the hydrate-sulfhydrate ratio and excess in the crude pulp for imparting certain desired physical properties to the finished lithopone and/or for influencing certain manipulative steps in the manufacturing process.

I have found that different barium ores (barytes) treated identically produce barium sulfide solutions which, when precipitated with uniform zinc sulfate solution, give different kinds of crude lithopone requiring different calcining manipulations and different general handling throughout the balance of the lithopone plant. The only proven difference in various lots of barium sulfide solutions is the ratio of sulfide sulfur to barium, which determines the ratio of barium hydrate to barium sulfhydrate. In what may be considered a typical barium sulfide solution, the ratio of barium present as hydrate to barium present as sulfhydrate is approximately 53 to 47. The barium present as sulfhydrate in such solutions may, however, vary in practice from 44 to 51%, while the barium present as hydrate may correspondingly vary from 56 to 49%. Other conditions remaining the same, I have found that substantially uniform crude lithopones will be produced when the crude pulps contain substantially the same excess of and ratio between barium hydrate and barium sulfhydrate.

I have, moreover, discovered that the physical properties (oil-absorption, alkalinity, hiding-power or strength, wetability or ease of incorporation in oil, etc.) of finished lithopone can be controlled or varied to some extent at least by the excess of and ratio between the hydrate and sulfhydrate radicals in the crude pulp at the end-point of the precipitating step, all other conditions and manipulative steps being the same. Thus, in general, the higher the hydrate content of the crude pulp (other conditions remaining the same), the lower will be the oil-absorption of the finished lithopone and the higher its degree of alkalinity.

In the drying of the crude lithopone (after filter-pressing of the crude pulp) as well as in the calcining operation, the barium sulfhydrate tends to oxidize whereby its availability for producing alkalinity in the finished lithopone is lost. On the other hand, barium hydrate does not tend to lose its alkalinity by oxidation. Hence, with hydrate present in greater proportion, alkalinity will be more permanently maintained, and uniformity of the desired degree of alkalinity of the finished lithopone is better assured.

While an increase in the ratio of hydrate to sulfhydrate $\left(\frac{OH}{SH}\right)$ tends to reduce the oil-absorption of the finished lithopone, and to bring out flatness, alkalinity and wetability, it also tends to increase the zinc oxide ($ZnO$) content and by more or less the same token to decrease the zinc sulfide ($ZnS$) content and may therefore work away from maximum hiding power or strength.

Messrs. Breyer, Croll and Farber, in United States Patent No. 1,411,645, April 4, 1922, have described the effect of varying amounts of electrolyte (such as soluble chlorides) in the precipitating liquors upon the manipulative steps of lithopone manufacture and the physical properties of the finished product. I have discovered that varying excesses of and ratios between the hydrate and sulfhydrate radicals in the crude pulp exercise substantially similar effects, although in lesser degree. Thus, the calcining temperature, necessary to give the lithopone satisfactory strength, is lowered as the ratio of hydrate to sulfhydrate in the crude pulp is increased, other conditions remaining the same. Similarly, increase in the hydrate-sulfhydrate ratio raises the critical light-resistance temperature. Accordingly, with other conditions the same and in particular the electrolyte content of the precipitating liquors control of the calcining temperature can be effected, to some extent, by control of the hydrate-sulfhydrate ratio and excess in the crude pulp.

From the manufacturing standpoint, the most important aspects of the hydrate-sulfhydrate excess and ratio control are the adjustments or variations it makes possible in the oil-absorbing properties and alkalinity of the finished lithopone. Messrs. Breyer and Farber in U. S. Patent, No. 1,446,637, February 27, 1923, have pointed out the advantages of securing a certain limited range of alkalinity in the finished lithopone by carrying an appropriate "excess of barium sulfide" in the precipitating liquors. Control of the hydrate-sulfhydrate ratio and excess, in accordance with the principles of the present invention, promotes permanency of the desired degree of alkalinity in the subsequent drying and calcining operations, and insures greater uniformity of the finished product with respect to its alkalinity.

The effect of different excesses and ratios of hydrate and sulfhydrate radicals upon the physical properties of the finished lithopone, as well as the influence of such different excesses and ratios upon the manipulative steps of the manufacturing process, are best determined by a series of preliminary tests. Thus, with all other conditions remaining the same, crude lithopones are made with varying excesses and ratios of hydrate and sulfhydrate radicals in the crude pulp, and such crude lithopones are calcined under known, and varying if desired, conditions. By such preliminary tests, the effect of different excesses of and ratios between hydrate and sulfhydrate radicals in the crude pulp can be determined and expressed, if desired, in the form of curves. In this manner, it is possible to predetermine or accurately predict the quality or properties of a finished lithopone, as well as the required manipulation in drying, calcining etc. for different excesses and ratios of hydrate and sulfhydrate radicals in the crude pulp (other conditions being the same or the effect of variations therein being known).

The practice of the present invention, in one of its aspects, thus involves preliminarily determining the effect on the physical properties of the finished lithopone of varying excesses of and ratios between hydrate and sulfhydrate radicals at the end-point of the precipitating step, and then controlling the precipitating step so as to establish at the end-point of the reaction such a predetermined excess of and ratio between the hydrate and sulfhydrate radicals as to develop the desired physical properties of the finished lithopone, after appropriate drying, calcining etc. In another aspect, the invention involves preliminarily determining the temperatures at which crude lithopone (precipitated from solutions containing varying excesses and ratios of hydrate and sulfhydrate radicals at the end-point of the precipitating step) must be calcined in order to develop the desired strength and color as well as the temperatures above which lithopone (precipitated from solutions containing similarly varying excesses and ratios of hydrate and sulfhydrate radicals at the end-point of the precipitating step) must not be calcined in order to maintain satisfactory resistance to light for paint purposes, and then so controlling the excess of and ratio between the hydrate and sulfhydrate radicals at the end-point of the precipitating step that on calcining the precipitate (after appropriate drying) at a temperature sufficient to develop the desired hiding-power or strength and color, resistance to light is substantially maintained.

The following description indicates, merely by way of example, suitable procedures for carrying out the invention in plant practice.

In the precipitating step or stage of lithopone manufacture an appropriate amount of the zinc sulfate solution is run into the precipitating tank. Barium sulfide solution is then gradually added to the zinc sulfate solution in the tank and the mixture in the tank is constantly stirred. As the end-point of the reaction is approached, the mixture in the tank is frequently tested with appropriate indicators. Excess of the barium sulfide solution over and above the amount necessary to react with the zinc sulfate solution is indicated when the crude pulp has an alkaline reaction, as, for example, when tested with phenolphthalein. Practice, the amount or degree of "barium sulfide excess" is usually gauged by the depth of the pink tint obtained in the phenolphthalein test, or the depth of tint obtained by any other appropriate test.

In the preferred practice of the present invention, the filtrate from a sample of the crude pulp, that is the mixture in the precipitating tank after the zinc sulfate has been satisfied, is tested or analyzed for hydrate and sulfhydrate radicals. To this end, an appropriate sample of the crude pulp is taken and filtered. A known portion of the filtrate is then quantitatively tested for hydrate (OH) and a known portion of the filtrate is quantitatively tested for sulfhydrate (SH) or sulfur (S). Both the excess of and ratio between the hydrate and sulfhydrate radicals in the crude pulp are thus determined.

Any appropriate procedures for hydrate and sulfhydrate determinations may be employed. I have found it convenient to titrate 25 cc. of the filtrate with N/10 iodine solution (iodine dissolved in an aqueous solution of potassium iodide) for the sulfhydrate determination, and to titrate 250 cc. of the filtrate with .25 N hydrochloric acid (HCl) solution for the hydrate determination.

In accordance with the present invention, the predetermined excess of and ratio between the hydrate and sulfhydrate radicals at the endpoint of the precipitating step will be chosen so as to impart certain desired physical properties to the finished lithopone and/or so as to produce certain desired influences upon the subsequent manipulative steps in the manufacturing process. The establishment of the desired predetermined excess of and ratio between the hydrate and sulfhydrate radicals at the end-point of the precipitating step can be effected in various ways. Thus, the control of the hydrate-sulfhydrate excess and ratio may be made entirely in the barium solution or liquor before precipitation, or the control of this excess and ratio may be made entirely after the precipitation has been made, or both of these methods may be resorted to to effect the desired ultimate control of the hydrate-sulfhydrate excess and ratio. I prefer to first regulate and control the hydrate-sulfhydrate ratio in the barium sulfide liquor itself, prior to precipitation. Any necessary final adjustment of the hydrate-sulfhydrate excess and ratio can then be made in the precipitating tanks, or even in the crude pulp storage tanks.

Thus, in accordance with my preferred practice, the barium sulfide solution is prepared so as to maintain an established ratio of barium hydrate to barium sulfhydrate. These solutions are analyzed or tested for hydrate and sulfhydrate, and their preparation is so controlled as to maintain the desired ratio of hydrate to sulfhydrate substantially constant. The usual corrective for the barium sulfide solution is the addition to the solution of barium hydrate [$Ba(OH)_2$].

In addition to controlling the ratio of barium hydrate to barium sulfhydrate in the barium sulfide solution, analyses or tests of the filtrate from a sample of the crude pulp should preferably be made, as hereinbefore described. At this stage of the operation, the ratio of the hydrate radical to the sulfhydrate radical can be increased by adding barium hydrate to the crude pulp, and the ratio of the sulfhydrate radical to the hydrate radical can be increased by adding sulfuric acid to the crude pulp. If desired, a final check on the excess and ratio of hydrate and sulfhydrate radicals in the crude pulp can be made by analyzing or testing the filtrate from the crude lithopone filters. In ordinary plant practice, the crude pulp will be stored for a period of from one to eight hours, and where great refinement of control is desired, analyses or tests of the crude pulp for hydrate and sulfhydrate radicals may be made during this period of storage, and any necessary corrective measures taken to establish the desired predetermined excess and ratio of hydrate and sulfhydrate radicals.

The regulation and control of the barium present as hydrate and sulfhydrate in the barium sulfide solution can be promoted in various ways. In general, barytes of high iron or manganese content produce solutions or liquors relatively high in barium hydrate, and by stocking the baryte ores of different iron and/or manganese content, one is able to select ores that will produce solutions either relatively high or low in hydrates. The hydrate content of the barium sulfide solution can also be regulated by appropriately mixing ores of different iron and/or manganese content.

The barium hydrate content of the barium sulfide solution can also be increased by the use of a moist charge in the baryte furnaces. Decreasing the proportion of coal in the charge of the baryte furnaces also tends to increase the barium hydrate content of the resulting barium sulfide solution. These expedients, however, may lower the recovery of barium from the ore.

In leaching the black ash (product of the baryte furnaces), the first wash will contain a relatively large proportion of barium sulfhydrate; the second wash will contain less barium sulfhydrate and more barium hydrate, and subsequent washes will be high in barium hydrate particularly with the use of hot water. The solid phase or residue will be high in barium hydrate. Accordingly, as leaching efficiency improves, slightly higher hydrate contents are obtained because the last extractions run higher in barium hydrate.

In analyzing or testing the barium sulfide solution or liquor, the following procedure has been found convenient in actual practice:

A ten cubic centimeter (cc.) sample of barium sulfide liquor (at about 60° C.) is put into a beaker containing 250 cc. of water. Three drops of phenolphthalein indicator are added and the solution titrated to a colorless endpoint with .25 N hydrochloric acid. To this same sample three drops of methyl orange indicator are then added and titrated with .35 N hydrochloric acid to a slight pink endpoint. The first part of the analysis with the phenolphthalein indicator determines the strong basic radical (OH), while the second part of the analysis with the methyl orange indicator determines the weak basic radical (SH). If $a$ and $b$ represent the number of cubic centimeters of hydrochloric acid used in the first and second parts, respectively, of the analysis, then the percentage of hydrate and sulfhydrate radicals in the barium solution are calculated as follows:

$$\text{Percent hydrate (OH)} = \frac{a}{a+b} \times 100$$

$$\text{Percent sulfhydrate (SH)} = \frac{b}{a+b} \times 100$$

It is possible in some instances to obtain the predetermined excesses and ratios of hydrate and sulfhydrate radicals, contemplated by the invention, by hydrates other than barium hydrate. In other words, while the full advantages of the invention are normally secured when the hydrate-sulfhydrate ratio represents the ratio of barium present as hydrate to the barium present as sulfhydrate, it may be possible, in some cases, to substitute other hydrates (such as calcium, magnesium or sodium) for part of the barium hydrate.

The moisture content of the dried crude lithopone exercises some influence on the physical properties of the finished lithopone (more particularly alkalinity and wetability), and should be taken into consideration. Alkalinity of the lithopone is more readily maintained and carried through from the precipitating step to the finished product when the crude lithopone charged into the calcining apparatus is not completely dried. In this connection, moisture contents of from 3 to 8%, or even higher, in the crude dried lithopone are of advantage. By such incomplete drying of the crude lithopone, supplemented if desired by the use of steam during calcination and/or quenching in alkaline water, it is possible to carry higher proportions of sulfhydrate in the crude pulp and obtain the desired physical properties of the finished lithopone, than could be carried where the crude lithopone is completely dried.

Another contributing factor to the ultimate alkalinity of the finished lithopone, which it may be necessary to take into account in practicing the present invention and maintaining uniformity of the finished product, is the alkalinity of the quenching, or even milling, water, as well as of any washing water. Carbonates of magnesium and calcium in such water are broken down on boiling to hydrates, and consequently in quenching the hot lithopone, or possibly in the milling operation, free alkalies are produced. Accordingly, where the quenching, milling, or washing waters are naturally (or otherwise made) alkaline, care must be taken to maintain this alkalinity uniform, although variations therein may be compensated for by appropriate changes in the hydrate-sulfhydrate excess and ratio at the endpoint of the precipitating step.

Where the hydrate is present in the crude pulp solely as barium hydrate and/or where it is not essential to accurately determine the so-called "barium sulfide excess", analyses or tests for hydrate alone may be employed instead of analyses or tests for both hydrate and sulfhydrate, as hereinbefore described. In such cases, the sulfhydrate content of the filtrate from a sample of the crude pulp may, if desired, be calculated by difference, the accuracy of this calculation depending largely upon the proportion of barium hydrate to other hydrates present in the crude pulp. Accordingly, in certain cases, as, for example, where refinement of control is not essential and/or where uniform alkalinity is particularly sought, the control of the hydrate-sulfhydrate excess and ratio and/or the establishment in the crude pulp of a predetermined hydrate-sulfhydrate excess and ratio at the endpoint of the precipitating step may be abbreviated or shortened to hydrate control and/or the establishment in the crude pulp of a predetermined amount of hydrate.

The following specific examples will further illustrate the practice of the invention:

*Example A.*—For the production of a lithopone of relatively high oil-absorption.

The zinc sulfate solution is approximately 25° Bé, and the barium sulfide solution approximately 13° Bé. The precipitating liquors contain about 0.4 grams (or less) of chlorine per liter of zinc sulfate solution calculated with respect to a solution of 20° Bé. at 20° C. The temperature of the liquors during precipitation is about 65–70° C. Thirty pounds of 30° Bé. sulfuric acid is added to the precipitating tank along with the zinc sulfate solution (19521 pounds). The filter-press cake from the crude pulp contains about 50% water. The crude lithopone is substantially completely dried, that is, until its average moisture content is about 1% or less. The lithopone is calcined in vertical retorts of the type described in the United States patent of Singmaster and Breyer, No. 1,411,647, dated April 4, 1922, and the temperature of calcination is approximately 850° C. The ratio of hydrate to sulfhydrate in the barium sulfide solution is expressed by the following equation:

$$\frac{\text{Barium as hydrate}}{\text{Barium as sulfhydrate}} = \left(\frac{53-51\%}{47-49\%}\right)$$

The precipitating step is carried out and controlled so as to establish in the crude pulp at the endpoint of the reaction that excess and ratio of hydrate and sulfhydrate radicals indicated and determined by the following titration tests:

| Titration with N/10 iodine per 25 cc. of filtrate from sample of crude pulp | Titration with .25N HCl per 250 cc. of filtrate from sample of crude pulp |
|---|---|
| 1.2–1.6 cc. | 3.0–4.0 cc. |

*Example B.*—For the production of a lithopone of medium oil-absorption.

The precipitating liquors contain 0.4 to 0.5 grams of chlorine per liter, calculated with respect to a zinc sulfate solution of 20° Bé. at 20° C. The ratio of hydrate to sulfhydrate in the barium sulfide solution is expressed as follows:

$$\frac{\text{Barium as hydrate}}{\text{Barium as sulfhydrate}} = \frac{54-52\%}{46-48\%}$$

The titration tests are as follows:

| Titration with N/10 iodine per 25 cc. of filtrate from sample of crude pulp | Titration with .25N HCl per 250 cc. of filtrate from sample of crude pulp |
|---|---|
| 1.2–1.6 cc. | 3.0–6.0 cc. |

The other conditions are substantially the same as in Example A, except that the calcining temperature may be slightly lower.

*Example C.*—For the production of a lithopone of relatively low oil-absorption.

The precipitating liquors containing 0.75 to 1.0 grams of chlorine per liter of zinc sulfate solution, calculated with respect to a solution of 20° Bé. at 20° C. The calcining temperature is about 750° C. The ratio of hydrate to sulfhydrate in the barium sulfide solution is as follows:

$$\frac{\text{Barium as hydrate}}{\text{Barium as sulfhydrate}} = \frac{55-53\%}{45-47\%}$$

The titration tests are as follows:

| Titration with N/10 Iodine per 25 cc. of filtrate from sample of crude pulp | Titration with .25N HCl per 250 cc. of filtrate from sample of crude pulp |
|---|---|
| .1.2–1.6 cc. | 6.0–9.0 cc. |

The other conditions are substantially the same as in Example A.

I claim:—

1. In a process for the manufacture of lithopone in which a predetermined excess and ratio of hydrate to sulfhydrate radicals is established in the crude pulp at the end point of the precipitating step, the improvement which comprises varying said excess and ratio of hydrate to sulfhydrate radicals in order to vary one or more of the physical properties of the finished lithopone to a desired extent.

2. In a process for the manufacture of lithopone in which a predetermined excess and ratio of hydrate to sulfhydrate radicals is established in the crude pulp at the end point of the precipitating step, the improvement which comprises varying said excess and ratio of hydrate to sulfhydrate radicals in amounts sufficient to provide finished lithopone products having differing but desired physical properties.

3. In a process for the manufacture of lithopone in which a predetermined ratio of hydrate to sulfhydrate radicals is established in the crude pulp at the end point of the precipitating step, the improvement which comprises varying said ratio of hydrate to sulfhydrate radicals in amount sufficient to permit of a temperature of calcination adapted to impart to the finished lithopone substantial resistance to light while at the same time developing satisfactory hiding-power and color.

In testimony whereof I affix my signature.

WILLIAM C. HOOEY.

CERTIFICATE OF CORRECTION.

Patent No. 1,759,116.      Granted May 20, 1930, to

WILLIAM C. HOOEY.

It is hereby certified that error appears in the printed specification of the above numbered patent requiring correction as follows: Page 3, line 87, for "Practice" read "In practice"; page 4, line 95, for ".25" read ".35"; and that the said Letters Patent should be read with these corrections therein that the same may conform to the record of the case in the Patent Office.

Signed and sealed this 22nd day of July, A. D. 1930.

Wm. A. Kinnan,
Acting Commissioner of Patents.

hydrate to sulfhydrate in the barium sulfide solution is as follows:

$$\frac{\text{Barium as hydrate}}{\text{Barium as sulfhydrate}} = \frac{55\text{--}53\%}{45\text{--}47\%}$$

The titration tests are as follows:

| Titration with N/10 Iodine per 25 cc. of filtrate from sample of crude pulp | Titration with .25N HCl per 250 cc. of filtrate from sample of crude pulp |
|---|---|
| .1.2–1.6 cc. | 6.0–9.0 cc. |

The other conditions are substantially the same as in Example A.

I claim:—

1. In a process for the manufacture of lithopone in which a predetermined excess and ratio of hydrate to sulfhydrate radicals is established in the crude pulp at the end point of the precipitating step, the improvement which comprises varying said excess and ratio of hydrate to sulfhydrate radicals in order to vary one or more of the physical properties of the finished lithophone to a desired extent.

2. In a process for the manufacture of lithopone in which a predetermined excess and ratio of hydrate to sulfhydrate radicals is established in the crude pulp at the end point of the precipitating step, the improvement which comprises varying said excess and ratio of hydrate to sulfhydrate radicals in amounts sufficient to provide finished lithopone products having differing but desired physical properties.

3. In a process for the manufacture of lithopone in which a predetermined ratio of hydrate to sulfhydrate radicals is established in the crude pulp at the end point of the precipitating step, the improvement which comprises varying said ratio of hydrate to sulfhydrate radicals in amount sufficient to permit of a temperature of calcination adapted to impart to the finished lithopone substantial resistance to light while at the same time developing satisfactory hiding-power and color.

In testimony whereof I affix my signature.

WILLIAM C. HOOEY.

CERTIFICATE OF CORRECTION.

Patent No. 1,759,116.  Granted May 20, 1930, to

WILLIAM C. HOOEY.

It is hereby certified that error appears in the printed specification of the above numbered patent requiring correction as follows: Page 3, line 87, for "Practice" read "In practice"; page 4, line 95, for ".25" read ".35"; and that the said Letters Patent should be read with these corrections therein that the same may conform to the record of the case in the Patent Office.

Signed and sealed this 22nd day of July, A. D. 1930.

Wm. A. Kinnan,
Acting Commissioner of Patents.